June 14, 1966  D. L. KLASS ETAL  3,255,853
ELECTRO FLUID CLUTCH RESPONSIVE TO ELECTROPHORETIC PRINCIPLES
Filed Jan. 16, 1963
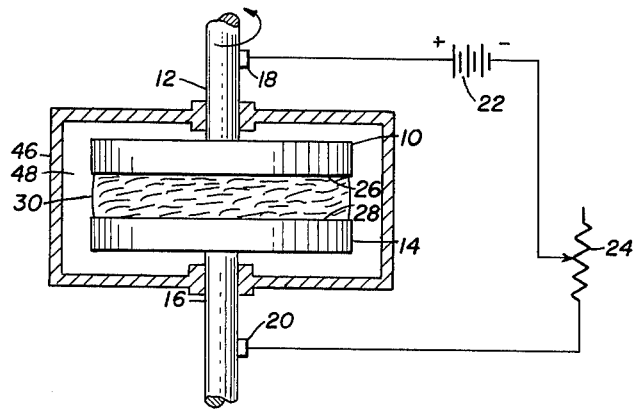
FIG. 1
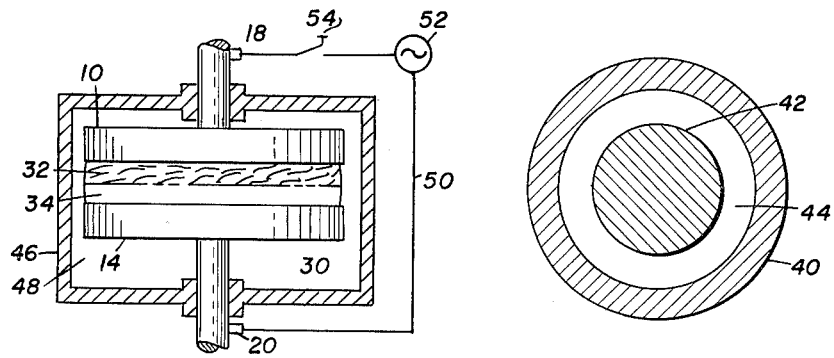
FIG. 2
FIG. 3
INVENTORS.
DONALD L. KLASS
THOMAS W. MARTINEK
BY
Edward H. Lang
ATTORNEY.

United States Patent Office 3,255,853
Patented June 14, 1966

3,255,853
ELECTRO FLUID CLUTCH RESPONSIVE TO ELECTROPHORETIC PRINCIPLES
Donald L. Klass, Barrington, and Thomas W. Martinek, Crystal Lake, Ill., assignors to Union Oil Company of California, Los Angeles, Calif., a corporation of California
Filed Jan. 16, 1963, Ser. No. 251,914
5 Claims. (Cl. 192—21.5)

This invention relates to a method and means for transmitting force or motion from a first member to a second member through the medium of a fluid. More particularly, this invention relates to the control of a coupling based upon the application of electrophoretic principles.

The prior art teaches the structure of couplings, clutches, and brakes wherein a driving member transmits force, usually in the form of torque, to a driven member through the medium of a viscous liquid. The torque or motion transmitted may be controlled by varying the effective areas or spacing of the driving and driven members, or by increasing the viscosity of the liquid force transmitting medium by the application of a magnetic field or an electric field, as is the case with magnetic fluid couplings and electrofluid couplings.

It is an object of this invention to provide a novel method for the control of force or motion transmitted through a liquid medium by varying the viscosity of the medium by the application of electric potential. Another object of this invention is to provide a novel clutch structure. Other objects of the invention will become apparent from the following description.

In brief, the coupling of this invention comprises a driving member and a driven member which are supported in closely spaced relationship, a fluid disposed between the driving and driven members, and means for applying electric potential across the driving and driven members. The fluid comprises a liquid and a thickener for the liquid, the thickener being a material which exhibits electrophoresis in the presence of an electric field. In operation, the force or motion transmitted through the coupling may be reduced by applying an electric potential between the driving and driven members, whereby the thickening material migrates through the body of liquid towards one of the said members. Thus, a portion of the body of liquid is denuded of thickener, while the concentration of thickener in another portion of the body of liquid is increased. The viscosity of the denuded liquid is reduced to substantially its residual viscosity, and the force transmitted by the liquid is thereby greatly reduced.

The invention will be described in detail with reference to the drawing, of which, FIGURE 1 is a frontal view in partial section of a coupling constructed in accordance with the principles of this invention illustrating the housing means and means for applying an electrical potential, FIGURE 2 is a partial sectional view of the coupling of FIGURE 1 illustrating the housing, means for applying an electrical potential and the migration of thickening agent which occurs under the influence of an applied potential, and, FIGURE 3 is a sectional view of an alternate coupling structure.

Referring to FIGURE 1, rotatable coupling member 10 is supported by shaft 12 and driven by a motor, not shown. A corresponding coupling member 14 is supported adjacent to coupling member 10 by shaft 16. Brushes 18 and 20, together with D.C. potential source 22 and potentiometer 24 provide means for applying electric potential across coupling members and 10 and 14.

The coupling members and shafts are made of a conductive metal, such as steel, and are provided with spaced, adjacent coupling surfaces 26 and 28. A force transmitting fluid 30 is disposed between surfaces 26 and 28 and confined by housing member 46 shown in cross section. The force-transmitting fluid 30 fills the space 48 within housing 46 and only that portion of the fluid between the coupling members 10 and 14 is illustrated.

Fluid 30 consists of a liquid in which is incorporated a finely divided thickener. The thickener is a material which when added in small amounts to the dielectric liquid substantially increases the viscosity of the liquid, and which exhibits electrophoresis in the presence of an applied D.C. potential. The thickener is present in the liquid in amounts sufficient to substantially increase the viscosity of the liquid. The liquid, in pure form, preferably has a low viscosity. The additive thickener increases the viscosity of the liquid by a substantial amount dependent upon the effectiveness of the thickener and the amount in which it is incorporated. Usually the viscosity of the liquid should be increased by a factor of 10 to 10,000, the actual extent of increase being largely a matter of choice.

The operation of the coupling is very simple. Suppose for example, the liquid has a viscosity of 1 centipoise, and a thickening additive is incorporated in an amount sufficient to increase the viscosity of the liquid to 100 centipoises. Depending upon the physical construction of the coupling, specifically, the area of the adjacent coupling surfaces 26 and 28, the distance between the coupling surfaces, and the smoothness or roughness of the coupling surfaces, the effects of which factors are well understood by those skilled in the art, the coupling will be capable of transmitting a certain torque, say 10 inch-ounces. Now an electric potential is applied across the coupling members, such as to produce migration of the electrophoretic thickener towards one of the coupling members and away from the other.

This is further illustrated by FIGURE 2, which shows housing member 46, in cross section, with the force-transmitting fluid 30 filling space 48 therein. This figure illustrates the application of an A.C. potential to coupling members 10 and 14 by means of brushes 18 and 20, line 50 connected to A.C. potential 52 and controlled by switch 54. The enriched stratum 32 and the denuded stratum 34 are portions of force-transmitting fluid 30 confined by housing member 46.

Assuming the polarity shown in FIGURE 1, and that the thickener is constituted of particles, molecules, or ions having a net negative charge, or displaying a net negative charge in the presence of an electric field, migration towards coupling member 10 will occur, to produce a stratification in the liquid as shown in FIGURE 2. Thus the liquid will comprise a stratum 32 which is enriched in thickener and therefore of increased viscosity, and a stratum 34 which is substantially denuded of thickener and therefore of approximately 1 centipoise viscosity. The torque transmitted by the coupling is dependent upon the viscosity of the stratum of minimum viscosity, since this stratum determines the plane at which shear will occur. The torque or motion transmitted by the coupling, which is a function of viscosity, will be reduced by a factor of somewhat less than 100, depending upon the final shear rate in the denuded phase.

Referring to FIGURE 3, a coupling is seen to be formed by two, concentric, rotatively supported members 40 and 42, which are radially spaced to form a fluid filled annulus 44. This permits the utilization of dielectrophoretic particle migration, as well as electrophoretic migration, since the application of an electric potential between members 40 and 42 inherently produces a divergent field. Where dielectrophoretic action is utilized, high potentials are required (although the current is very small) and the liquid vehicle should be a good dielectric, such as a refined mineral oil.

It will be understood that the structures shown in FIGURES 1 to 3 are merely illustrative of the invention. The principle of the invention is applicable to clutches, brakes, and couplings of every description wherein force or torque is transmitted through a fluid medium. The motion, for example, can be rotary, curvilinear, or rectilinear, providing only that the coupling members are properly shaped and supported to move as intended. Both of the members of the coupling may be movable, or one may be stationary, as in a brake. Where the coupling members are rotatably supported, which is the general case, the corresponding surfaces 26 and 28 need not be flat, but can be any corresponding surfaces of revolution, such as surfaces of spaced internal and external cylinders, cones, or even spheres. The electrophoretic movement of thickener may be the only means for controlling force transmission, or may be merely auxiliary means. For example, structures are well known in the art wherein the force transmission is varied by altering the spacing between the coupling members or by altering the effective overlap of the coupling surfaces, as by withdrawing one cylinder from within another. The method and principle of this invention has special utility in conjunction with such prior art viscous fluid couplings, since a principal drawback of such couplings is that considerable heat is built up during high speed idle of the coupling due to the residual viscosity of the force transmitting fluid medium. Also, fluid couplings display undesirably high residual force transmission at idle, even when the force varying means has been utilized to the maximum extent to reduce force transmission through the coupling. The problems of heat build up and residual force or torque transmission can be greatly alleviated by employing the principal of this invention, wherein a fluid medium having a desirably high viscosity may be subjected to electrophoretic action whereby a fluid stratum of greatly reduced viscosity is produced so that the effective viscosity is reduced to a desirably low level for idle conditions.

An almost infinite variety of force transmitting fluids may be utilized in accordance with this invention. The liquid may be any of a wide variety of materials, organic or aqueous, which are of suitably high resistivity and have a boiling point preferably not below about 200° F. While materials of lower boiling points may be used, especially when the system is operated under pressure, greater fluid stability is achieved under operating conditions where the boiling point of the dielectric liquid is above 200° F., and preferably as high as 400° F. Examples of suitable liquids are water, and non-polar organic materials such as octane and higher paraffinic hydrocarbons, toluene, and higher boiling aromatic hydrocarbons, octene and higher boiling olefins, oleaginous materials such as white oils, lubricating oil stock such as 85 vis. neutral oil, and various synthetic oils commonly used as transformer oils, especially those in the lower viscosity ranges. Water and hydrocarbon liquids are preferred because of their low cost. Water and relatively low molecular weight hydrocarbon materials, such as octane, are desirable because of their low normal viscosity. On the other hand, higher boiling hydrocarbons and refined oils are desirable because of their suitability for higher temperatures. Generally, the higher boiling materials display greater viscosity.

The thickening agent can be any material which substantially increases the viscosity of the liquid to which it is added, and which exhibits electrophoresis in the presence of an applied electric field, (or dielectrophoresis in the presence of a divergent field). The nature of materials which exhibit electrophoresis is well known to those skilled in the art. In brief, those materials which display a net electric charge, positive or negative, or which become charged under the influence of an electric field exhibit the electrophoretic phenomenon. The electrophoretic additives must be finely dispersed to achieve the desired thickening effect and be subject to electrophoresis. They may be in the form of finely divided particles, having sizes preferably not greater than about 5 microns in diameter, and still more preferably not greater than 1 micron diameter, or may be in the form of molecules, usually large molecules, which are soluble in the liquid and form therein a true solution, rather than a suspension or dispersion. The material need not be capable of dissociation, many particles and polymeric molecules are known which do not dissociate but yet display electrophoresis. If a particle, the material may be one which is commonly considered to have a net charge, or it may be a material which under the influence of an electric field appears to acquire a net charge. While the mechanism of electrophoresis is not clearly understood, it is believed that some materials, especially particles, commonly considered to be electrically neutral, when dispersed in a liquid and exposed to a strong electric field behave as if charged, and probably actually acquire a charge. An uncertain but probable explanation for this phenomenon is that the particle may, under the influence of a strong electric field, become a strong dipole due to the migration of electrons towards one end of the particle. Thus the particle, though having zero net charge, will have strong charges of opposite sign at opposite ends of the particle. Then by conduction through an imperfect dielectric, or more probably by corona discharge, the magnitude of one of the dipoles is reduced, and the particle thereby acquires a net charge and migrates towards the pole of opposite sign.

When electrophoretic action is relied upon, the liquid vehicle will preferably be fairly conductive, i.e., a resistance of 1000 ohms per centimeter or less. Suitable electrophoretic thickeners include the following colloids:

POSITIVE CHARGE

| | |
|---|---|
| Ferric hydroxide | Zirconium hydroxide |
| Aluminum hydroxide | Methylene Blue |
| Chromium hydroxide | Basic proteins |
| Thorium hydroxide | |

NEGATIVE CHARGE

| | |
|---|---|
| Gold | Silicic acid |
| Silver | Silica gel |
| Platinum | Vanadium pentoxide |
| Sulphur | Congo red |
| Selenium | Albumium |
| Carbon | Casein |
| Arsenic sulfide | Gelatin |
| Stannic sulfide | Starch |
| Plumbic sulfide | Clay |
| Cupric sulfide | Quartz |
| Stannic acid | Paraffin |

The foregoing lists should be considered exemplary rather than exhaustive. Various texts list numerous other materials which are electrophoretic, most of which will thicken liquid vehicles if added in sufficient quantities. The volume fraction of particles in the particle-liquid mixture will range from as low as 0.01 to as high as 0.70, depending primarily on the ability of the particles to thicken the liquid, and the extent of thickening desired. Additives, such as sodium chloride, may be employed to adjust the conductivity of the mixture if desired.

Where dielectrophoretic migration is relied upon, high voltages will be employed (say 20,000 volts per inch) and the liquid vehicle, which may be a refined hydrocarbon oil, should have a resistivity preferably in excess of $10^{10}$ ohm-cm.

Examples of suitable dielectrophoretic thickeners for aqueous liquids are higher polymers of acrylamide which are hydrolyzed to an extent sufficient to convert perhaps 1% of the amide groups to carboxyl groups. About 0.1% by weight of such materials will raise the viscosity of water to about 10 centipoises. Polymeric tertiary amines may be used in the amount of about 1% to increase the viscosity of water to about 500 centipoises. A preferred thickener is ethylene oxide polymers having an average molecular weight of 1,000,000, which, when added to water in the amount of 1% by weight, will increase the viscosity of the water to about 500 centipoises. Smaller amounts of the additive will produce smaller increases in viscosity. The effectiveness of this thickener is enhanced as the molecular weight increases to about 5,000,000.

With respect to suitable thickeners for organic dielectric liquids, such as hydrocarbon liquids, among the particulate materials, which should have an average diameter of at least .02 to 1 micron, may be mentioned silica gel, alumina gel, barium titanate, calcium titanate, zinc titanate, cobalt titanate; and organophilic clays such as the reaction products of bentonites, samsonites, and fuller's earth, with amines having a hydrocarbon radical containing at least 10 carbon atoms. Examples of suitable natural thickeners are proteins such as casin and gelatin, gum arabic, gum tracacanth, and others. Uncoalgulated rubber latex may also be used. Among the synthetic organic thickeners which are suitable may be mentioned the high molecular weight polymers of olefins such as propylene and isobutylene, especially polymers having a molecular weight of at least about a thousand. Copolymers such as of isobutylene and isoprene may be used. Also hydrocarbon polymers containing at least 2 activated vinyl groups can be employed. Polymers of such compounds as divinyl benzene and divinyl succinate, and vinyl esters of polybasic acids, such as divinyl succinate, divinyl sebacate, and divinyl maleate may be used. Also polymers of the allyl esters and alpha-methallyl esters of acrylic acid and alpha-substituted acrylic acids, such as the allyl and methallyl esters of maleic acid and the glycol esters of maleic acid may be used. Other suitable thickeners include phenol formaldehyde resins which have not been polymerized beyond the first or A stage. Such resins may be used in the amount of about 2 to 5%. The above named materials are to be considered as illustrative, rather than exhaustive, of the liquids and thickeners which may be employed in accordance with this invention.

The distance between the adjacent coupling surfaces is not critical, distances in the range of 0.005 to 0.250 inch being satisfactory. The potential applied can vary widely, although it is dependent in part upon the distance between the coupling surfaces. Thus, a potential of not less than about 10,000 volts per inch should be employed to provide a reasonable time response with dielectrophoretic systems. With electrophoretic systems, low voltages in the range of 10 to 1000 volts per inch are satisfactory.

*Example I*

As a specific example of the method of this invention, a coupling is constructed employing steel cylinders spaced from each other at a distance of 0.010 inch as shown in FIGURE 3. A force transmitting fluid is formulated by incorporating 5 grams of ethylene oxide polymers having an average molecular weight of about 1,000,000 in 100 cc. of water. The resulting liquid has a viscosity of about 1000 centipoises. When employed as the fluid medium in the coupling, with the driving member of the coupling rotated at 100 r.p.m. a holding force of 1.8 ounces per square inch of coupling surface area is found to exist. The coupling is then energized by applying a D.C. potential of 10 volts, and the coupling force is found to decrease to 0.1 ounce per square inch, measured at the same driving member speed.

*Example II*

As another example of this invention, the coupling described in Example I is used with a fluid medium formulated by incorporating 10 grams of silica of average particle size 0.02 micron, 0.5 gram of glycermonooleate, and 1.0 gram of 1-hydroxyethyl 2-heptadecylimidazolene in 88.5 grams of mineral oil having a viscosity of 11 centipoises at 80° F. The viscosity of the resulting liquid is found to be about 15 centipoises at 100° F. When utilized in the coupling, with the coupling de-energized, a holding force of .03 ounce per square inch is found to result. When the coupling is energized by the application of an A.C. potential of 1,000 volts, the coupling force is reduced to .01 ounce.

*Example III*

In another example, 89.47 grams of zinc titanate having a surface area of 1.5 square meters per gram and an average particle size of 1.91 microns was dispersed in 8.54 grams mineral seal oil (vis. 9.2 centipoises at 80° F.) with 1.52 grams glycerolmonooleate. The holding force of the dispersion was measured with an apparatus of the configuration of FIGURE 1. With an alternating potential of about 200 kilovolt per inch holding force was increased 20 ounces per square inch. With a D.C. potential of 200 kilovolts per inch the holding force was decreased from about ½ ounce per square inch to much less than $\frac{1}{16}$ ounce per square inch. Examination of the device after the test showed that the titanate particles had migrated to the positive electrode leaving an oil rich upper phase of much reduced residual viscosity. The resistance to movement of the upper electrode was much less than that measurable by the calibrated spring gauge available. When the D.C. potential was removed and the upper electrode moved to remix the separated fluid, the application of an A.C. potential again caused a twenty-fold increase in holding power. Thus the residual viscosity was reversibly increased by an A.C. potential and decreased by a D.C. potential.

*Example IV*

In still another example 50.28 wt. percent silica of average particle size about 2 microns, water content of 11% based on dry silica, surface area of 745 square meters per gram and pore volume of 0.3 cubic centimeter per gram was dispersed in 49.72 weight percent of a vehicle having a viscosity of 10.45 centistokes at 100° F., a density of .9964 at 80° F., and a dielectric constant of 1.93 at 80° F. The resulting composition was a firm grease with an ASTM-D-1403–56 T Method ¼ scale pentration of 66. When tested in the same apparatus used for Example III, the holding force without applied potential was 1 oz. per square inch. When a D.C. potential of 200 kilovolts per inch was applied, holding force was decreased to less than $\frac{1}{16}$ ounce per square inch. When an A.C. potential of 200 kilovolts per inch was applied, holding force was increased to about 1.5 ounces per square inch.

It is known, as aforementioned, that certain fluids known as electrofluids display a dramatic increase in apparent bulk modulus when energized by an electric field. Certain of these electrofluids have been found to display a dramatic increase in apparent bulk modulus when energized by alternating potentials only, and be substantially inert in the presence of direct potential. It has been found that it is possible to formulate electrofluids which are energizable by alternating potentials, which are inert in the presence of D.C. fields, and which contain thickening particles of a material of very small particle size, which material is electrophoretic. Under the influence of an A.C. potential the viscosity of such a fluid is increased to the point where it becomes substantially solid. Under the influence of a D.C. potential, the viscosity of the fluid is decreased to a value substantially below the residual viscosity of the electrofluid, and to a viscosity approaching that of the vehicle from which the electrofluid is formulated. It is thus apparent that electrofluids may be formulated, contrary to the teachings of the prior art, such that they will display a decrease in apparent torque transmission in the presence of a D.C. field, and an increase in the presence of an A.C. field. Thus, it will be understood, that this invention may be practiced utilizing fluids which show a great increase in viscosity, and therefore in coupling effect, when an A.C. field is applied.

It will be further understood that the electrophoretic effect contemplated by this invention is achieved only by the application of a D.C. potential, or in some instances by an A.C. potential of extremely low frequency, less than about 5 cycles per second. A.C. power or D.C. power may be used in a divergent field to achieve the dielectrophoretic effect. In the appended claims, the word "cataphoresis" is to be construed to include both "electrophoresis" and "dielectrophoresis."

The embodiments of the invention in which an exclusive property or privilege is claimed are defined as follows:

1. An apparatus for controlling the transmission of force comprising a driving conductive member and a driven conductive member closely spaced therefrom and supported in electrically insulated relationship within a housing, a force-transmitting fluid consisting essentially of a liquid and a thickening amount of ethylene oxide polymers having an average molecular weight in excess of about 100,000 and a particle diameter no greater than about 5 microns which exhibits electrophoresis in the presence of an electric field disposed between said members and means for applying an electrical potential between said members.

2. An apparatus in accordance with claim 1 in which said force-transmitting fluid consists essentially of water and about 0.1 to 1% by weight of said ethylene oxide polymers.

3. An apparatus in accordance with claim 1 in which said force-transmitting fluid consists essentially of a hydrocarbon boiling above about 200° F. and about 0.1 to 1% by weight of ethylene oxide polymers having a molecular weight in excess of 1,000,000 and a particle diameter of about 0.02 to 5 microns.

4. An apparatus in accordance with claim 1 in which said conductive members define coaxial cylindrical surfaces radially spaced from each other and said means for applying an electrical potential is a source of A.C. current capable of applying a potential of about 1,000 to 5,000 volts per sq. inch across said driving and driven conductive members.

5. An apparatus in accordance with claim 1 in which said conductive members define substantially parallel spaced surfaces and said means for applying an electrical potential is a source of D.C. current capable of applying a potential of about 10 to 1,000 volts per sq. inch across said driving and driven conductive members.

References Cited by the Examiner

UNITED STATES PATENTS

| | | |
|---|---|---|
| 2,290,582 | 7/1942 | Donal. |
| 2,661,825 | 12/1953 | Winslow _____ 192—21.5 |
| 2,886,151 | 5/1959 | Winslow. |
| 3,047,507 | 7/1962 | Winslow _____ 192—21.5 X |

FOREIGN PATENTS 1,163,513  4/1958  France.

DAVID J. WILLIAMOWSKY, *Primary Examiner.*